(12) United States Patent
Davis

(10) Patent No.: US 9,141,187 B2
(45) Date of Patent: Sep. 22, 2015

(54) INTERACTIVE VEHICLE SYNTHESIZER

(71) Applicant: PANASONIC AUTOMOTIVE SYSTEMS COMPANY OF AMERICA, division of PANASONIC, Peachtree City, GA (US)

(72) Inventor: Gerald Clinton Davis, Fayetteville, GA (US)

(73) Assignee: Panasonic Automotive Systems Company of America, Division of Panasonic Corporation of North America, Peachtree, GA (US)

(*) Notice: Subject to any disclaimer, the term of this patent is extended or adjusted under 35 U.S.C. 154(b) by 283 days.

(21) Appl. No.: 13/754,322

(22) Filed: Jan. 30, 2013

(65) Prior Publication Data

US 2014/0211962 A1 Jul. 31, 2014

(51) Int. Cl.
G10K 11/16 (2006.01)
H03B 29/00 (2006.01)
A61F 11/06 (2006.01)
G06F 3/01 (2006.01)
G10K 11/178 (2006.01)

(52) U.S. Cl.
CPC .............. *G06F 3/01* (2013.01); *G10K 11/1788* (2013.01); *H04R 2499/13* (2013.01)

(58) Field of Classification Search
CPC ............. B60R 11/0217; G10H 1/0041; G10K 11/178; G10K 11/1784; G10K 11/1786; G10K 11/1788; H03G 3/001; H03G 3/20; H03G 3/32; H03G 7/002; H04N 11/00; H04R 1/08; H04R 2499/13; H04R 5/02
USPC ........... 381/300, 302, 56, 57, 71.1, 71.4, 104, 381/106, 107, 108, 118, 365, 389
See application file for complete search history.

(56) References Cited

U.S. PATENT DOCUMENTS

| | | | |
|---|---|---|---|
| 6,829,361 B2* | 12/2004 | Aarts | 381/309 |
| 2005/0129256 A1* | 6/2005 | Metcalf | 381/119 |
| 2005/0135635 A1* | 6/2005 | Prince | 381/86 |
| 2005/0172788 A1* | 8/2005 | Yamamoto | 84/611 |
| 2006/0011050 A1* | 1/2006 | Arimoto | 84/737 |
| 2006/0109102 A1* | 5/2006 | Gortz et al. | 340/531 |
| 2007/0182525 A1* | 8/2007 | McCarthy et al. | 340/425.5 |
| 2008/0130922 A1* | 6/2008 | Shibata et al. | 381/302 |
| 2008/0202323 A1* | 8/2008 | Isozaki et al. | 84/636 |
| 2008/0212788 A1* | 9/2008 | Bech et al. | 381/59 |
| 2008/0254824 A1* | 10/2008 | Moraes | 455/556.1 |
| 2010/0113104 A1* | 5/2010 | Kirigaya | 455/569.2 |
| 2010/0312369 A1* | 12/2010 | Dollar, Jr. | 700/94 |
| 2013/0156213 A1* | 6/2013 | Pan et al. | 381/71.4 |
| 2014/0304431 A1* | 10/2014 | Onohara et al. | 710/12 |

* cited by examiner

*Primary Examiner* — Khai N Nguyen
(74) *Attorney, Agent, or Firm* — Laurence S. Roach, Esq.

(57) ABSTRACT

A method of operating an audio entertainment system in a vehicle includes detecting an operating parameter of the vehicle. A sensor signal corresponding to the detected operating parameter is transmitted. Music that is audibly produced within the vehicle is musically modified dependent upon the sensor signal.

20 Claims, 3 Drawing Sheets

INTERACTIVE VEHICLE SYNTHESIZER

BACKGROUND OF THE INVENTION

1. Field of the Invention.

The present invention relates to entertainment systems for use in vehicles, and, more particularly, to methods of controlling the output of such entertainment systems.

2. Description of the Related Art.

Entertainment systems in motor vehicles are known to operate independently of the operation and functions of the remainder of the vehicle. User inputs may be used to select the content of the output of the entertainment system, but it is not known for user inputs to be used to modify the content of the output of the entertainment system. There are existing automatic noise cancellation (ANC) systems that reduce background noise. There are also automatic volume control (AVC) systems that maintain a constant sound pressure level (i.e., volume) based on the engine RPM or speed. However, entertainment systems today are otherwise not interactive and are largely unaware of the vehicle running status. Nor do current entertainment systems synthesize music.

SUMMARY OF THE INVENTION

The present invention may use input from vehicle engine sensors and controls to synthesize background music and graphic displays.

The invention comprises, in one form thereof, a method of operating an audio entertainment system in a vehicle, including detecting an operating parameter of the vehicle. A sensor signal corresponding to the detected operating parameter is transmitted. Music that is audibly produced within the vehicle is musically modified dependent upon the sensor signal.

The invention comprises, in another form thereof, a method of operating an audio entertainment system in a vehicle, including providing a sensor within a passenger compartment of the vehicle. The sensor is used to detect a user input from a user in the passenger compartment. A sensor signal corresponding to the detected user input is transmitted. Music that is audibly produced within the vehicle is musically modified dependent upon the sensor signal.

The invention comprises, in yet another form thereof, a method of operating an entertainment system in a vehicle, including, providing a plurality of sensors within the vehicle. At least one of the sensors is associated with a passenger compartment of the vehicle. At least one of the sensors is used to detect a user input from a user in the passenger compartment and/or an operating parameter of the vehicle. A sensor signal corresponding to the detected user input and/or operating parameter is transmitted. Musical entertainment content that is produced within the vehicle and/or video entertainment content that is produced within the vehicle is modified dependent upon the sensor signal.

An advantage is that the present invention may enhance the driver experience, provide entertainment to vehicle passengers, avoid passenger boredom, and provide the ability to customize the theme or audio/video "skin" of the vehicle.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
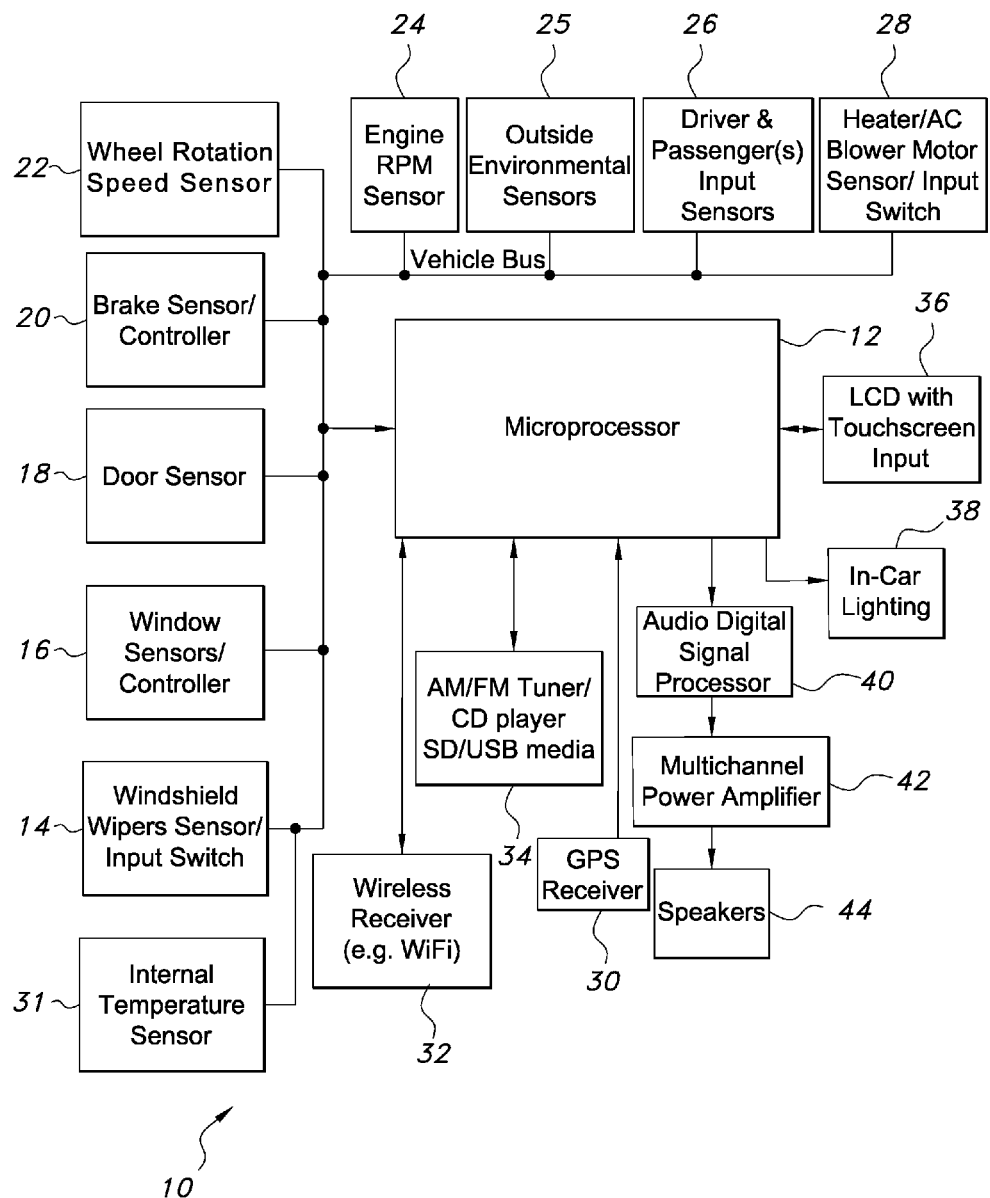
FIG. 1 is a block diagram illustrating one embodiment of an interactive vehicle synthesizer entertainment system of the present invention.

Referring now to the drawings, and particularly to FIG. 1, there is shown one embodiment of an interactive vehicle synthesizer entertainment system 10 of the invention. Input from various vehicle sensors may be used to modulate, generate or synthesize music and/or visualization (e.g., on an LCD display and/or via in-car lighting) based on user menu input. For example, the vehicle speed, engine RPM, windshield wiper speed, position of windows, opening/closing of doors or windows may be used to control the synthesis of music (e.g., background music, or additional synthesized music mixed with current music from a radio, CD, or MP3 source) and provide user-defined audio feedback and/or visualization of the operating status of the vehicle for entertainment purposes.

Entertainment system 10 includes a processor in the form of a microprocessor 12 which may receive inputs from in-car sensors and data sources including a windshield wiper sensor/input switch 14, window sensors/controller 16, a door sensor 18, braking sensor/controller 20, wheel rotation speed sensor 22, engine rpm sensor 24, outside environmental sensors 25, driver and passenger input sensors 26, heater/AC/blower motor sensor/input switch 28, GPS receiver 30 and passenger compartment temperature sensor 31. Microprocessor 12 may be in bi-directional communication with a wireless receiver 32 (e.g., WiFi), AM/FM tuner/CD player/SD/USB media 34, and an LCD display 36 with touchscreen input capability. Microprocessor 12 may control the operation and power to in-car lights 38. Microprocessor 12 may control and transmit output data and other information to an audio digital signal processor 40, which in turn may control and transmit output data to a multichannel power amplifier 42 and speakers 44.

Figure 2:
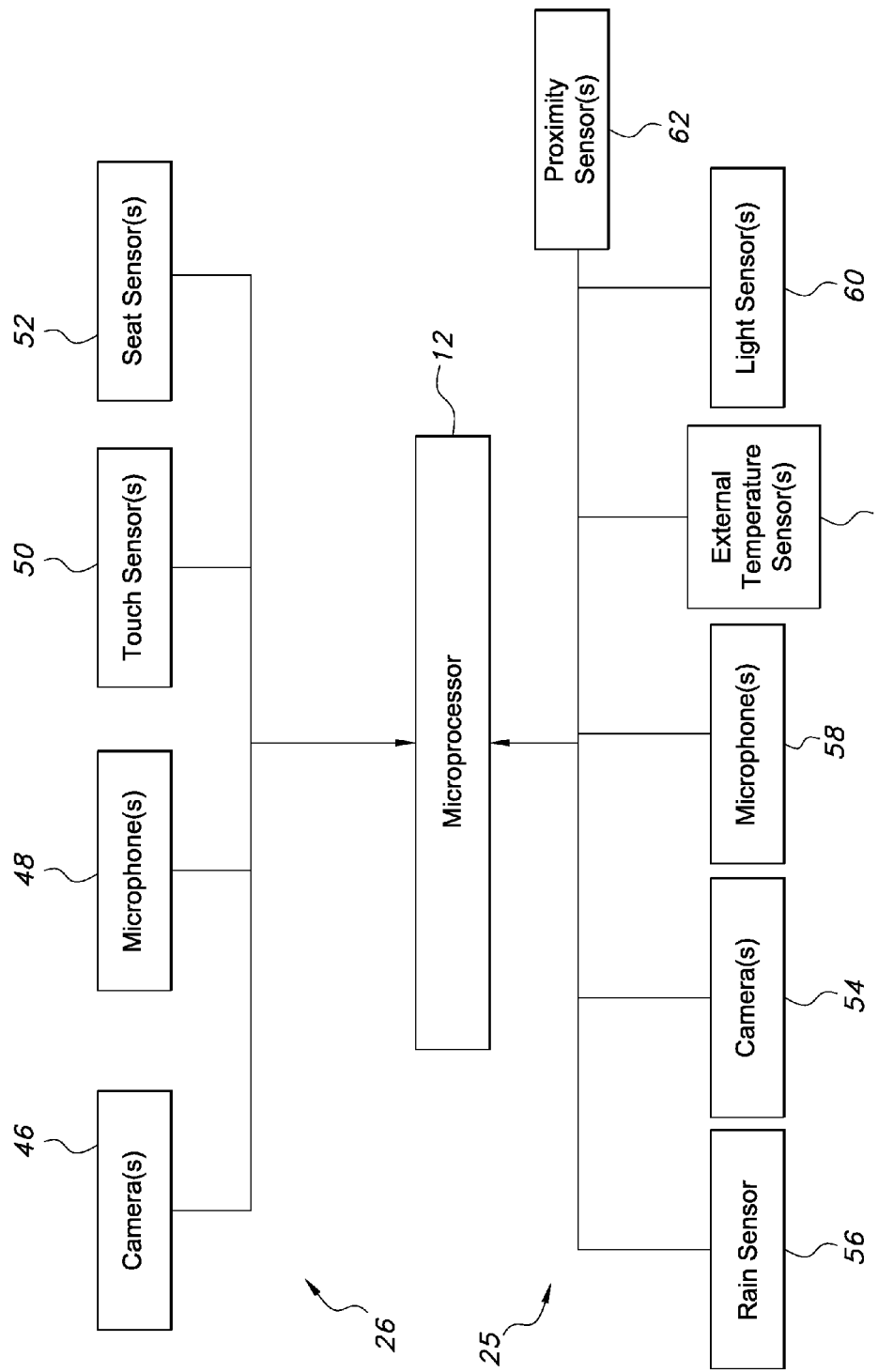
FIG. 2 is a block diagram illustrating the passenger input block the outside environmental sensor block of FIG. 1.

As shown in FIG. 2, driver & passenger input sensors 26 may include camera(s) 46, microphone(s) 48, touch sensor(s) 50, and seat sensor(s) 52. Via sensors 26, the driver and/or one or more passengers may provide inputs that do not just select audio/video content as conventionally known, but rather modify the audio/video content and/or are mixed with the audio/video content. For example, the driver or a passenger may interact with and/or control entertainment system 10 by playing along with and/or modifying the music by tapping on a touch sensor 50 on the vehicle's steering wheel or arm rest, for example. By tapping on touch sensor 50, the user may create or provide a rhythm that may be implemented m the audio content that is currently being played. For example, the beat and/or the tempo of the currently playing music may be modified to match the beat, tempo or rhythm of the tapping provided by the user. As another example, the beat, tempo or rhythm of the currently playing music may be unchanged by the user's tapping, but the user's tapping may add a percussion sound (e.g., drums) to the currently playing music, with the percussion sound having a beat matching the beat of the user's tapping. In-car lights 38 may be switched on/off or brightened/dimmed with a frequency matching the beat of the user's tapping.

In one embodiment, microprocessor 12 may determine the type of percussion sound in the music as originally recorded in a music studio (e.g., a drum sound or a tambourine sound), and enable the user to add a different type of percussion sound to the music by tapping or by moving some part of his body. Thus, the user may more easily distinguish and hear the percussion sound that he is adding to the music. For example, microprocessor 12 may determine the type of percussion sound in the music by analyzing the audible sound-spectrum frequency of rhythmically repeated sounds and ascertaining what percussion instrument is consistent with that audible frequency. If the sound is determined to be a drum sound, then the percussion sound added by the user may be presented in the form of a tambourine sound, for example.

In another embodiment, the type of percussion sound that the user adds to the music may depend on the type of movement that the user makes. For example, if the user moves his hands with a thrusting motion consistent with playing drums with drum sticks, then a drum sound may be added to the music. Alternatively, if the user moves his hands with a shaking motion consistent with playing tambourines, then a tambourine sound may be added to the music.

In one embodiment, a driver or passengers can play along with the music or add or change the beat of the music by use of a wireless device (e.g., a smartphone or similar wireless device) or by moving his hands in the air, such, as by "air drumming", for example. The positions of the user's hands may be determined and tracked by a camera, Theremin, or Wii type input device, for example.

The sounds and aural feedback of the vehicle can also be customized with familiar popular culture media themes (e.g., Jetsons, Star Trek, Adams Family, etc). As the driver changes controls and drives the vehicle, a character related to the theme may give the driver aural feedback about his driving habits, may give the driver tips or engine warnings and status, or may point out nearby locations.

Software running on microprocessor 12 may integrate the sensor inputs, and may accept user inputs via a menu based graphical user interface (GUI), or via interactive controls which interact with the driver to select tones, voices, harmonies, and pre-created musical baseline patterns that are user defined or follow a pre-conceived theme. The sensor inputs may modulate the baseline music to create an audio and video experience in the car that changes with driving conditions, engine parameters and control settings. The changes in synthesized music and visualization may provide a stimulating environment to avoid boredom and fatigue for the driver and passengers.

In one embodiment, a song selection played by the vehicle audio system is dependent upon an operating parameter of the vehicle. For example, in response to the driver turning on the ignition switch, the audio system may play a song with the lyrics "start me up"; in response to operation of the windshield wipers, the audio system may play a song with lyrics referring to rain; in response to a window motor operating to open a window, the audio system may play a song with lyrics referring to wind or the outdoors; in response to a vehicle HVAC system being turned to a heating operating state, the audio system may play a song with lyrics referring to heat; or in response to a vehicle HVAC system being turned to an air conditioning operating state, the audio system may play a song with lyrics referring to cool air.

The entertainment system may also modify entertainment content based on outside environmental conditions sensed by vehicle sensors within the scope of the invention. As shown in FIG. 2, outside environmental sensors 25 may include camera(s) 54, rain sensor 56, microphone(s) 58, light sensor(s) 60, proximity sensor(s) 62 and external temperature sensor(s) 64. Via sensors 26, the driver and/or one or more passengers may provide inputs that do not just select audio/video content as conventionally known, but rather modify the audio/video content. For example, in response to rain sensor 56 detecting rain, the audio system may play a song with lyrics referring to rain; in response to light sensor 60 detecting sunrise or sunset, the audio system may play a song with lyrics referring to sunrise or sunset; in response to vehicle proximity sensor 62 detecting another vehicle being in close proximity, the audio system may play humorous and entertaining comments about the closeness of the other vehicle; or in response to camera 54 in conjunction with microprocessor 12 detecting a brown-eyed female pedestrian or passenger with brown eyes in an adjacent vehicle, the audio system may play the song "Brown-eyed Girl", or another song with lyrics referring to a girl with brown eyes.

In one embodiment, the entertainment system may modify entertainment content based on a combination of outside environmental conditions, vehicle operating parameters, and/or user inputs. For example, if in-vehicle GPS or a vehicle proximity sensor indicates that the vehicle is in the far left lane and the speedometer indicates that the vehicle is traveling at highway speed, then the audio system may play an appropriate song such as the song "Life in the Fast Lane" by The Eagles. However, if inputs from the user indicate a rhythm, beat or tempo that is significantly slower than that of the song "Life in the Fast Lane," then the audio system may play another song, which may be a slower paced song, such as "Truckin" by The Grateful Dead in order to better match the tempo provided by the user. As another example, if a vehicle proximity sensor indicates that the vehicle is travelling slower than adjacent traffic, or, in conjunction with a speedometer, that the vehicle is in a traffic jam, or if the speedometer simply indicates that the vehicle is travelling slowly (e.g., below a predetermined speed), then the song "Slow Ride" by Foghat may be played by the audio system.

In one embodiment, UPS receiver 30 may provide the ability to modify music content based on location information and time of day, or season of the year, or holiday. A real time clock may be included in the entertainment system, and the GPS sensor may enable a more precise setting of the time of day, as well as provide vehicle direction and speed information.

Figure 3:
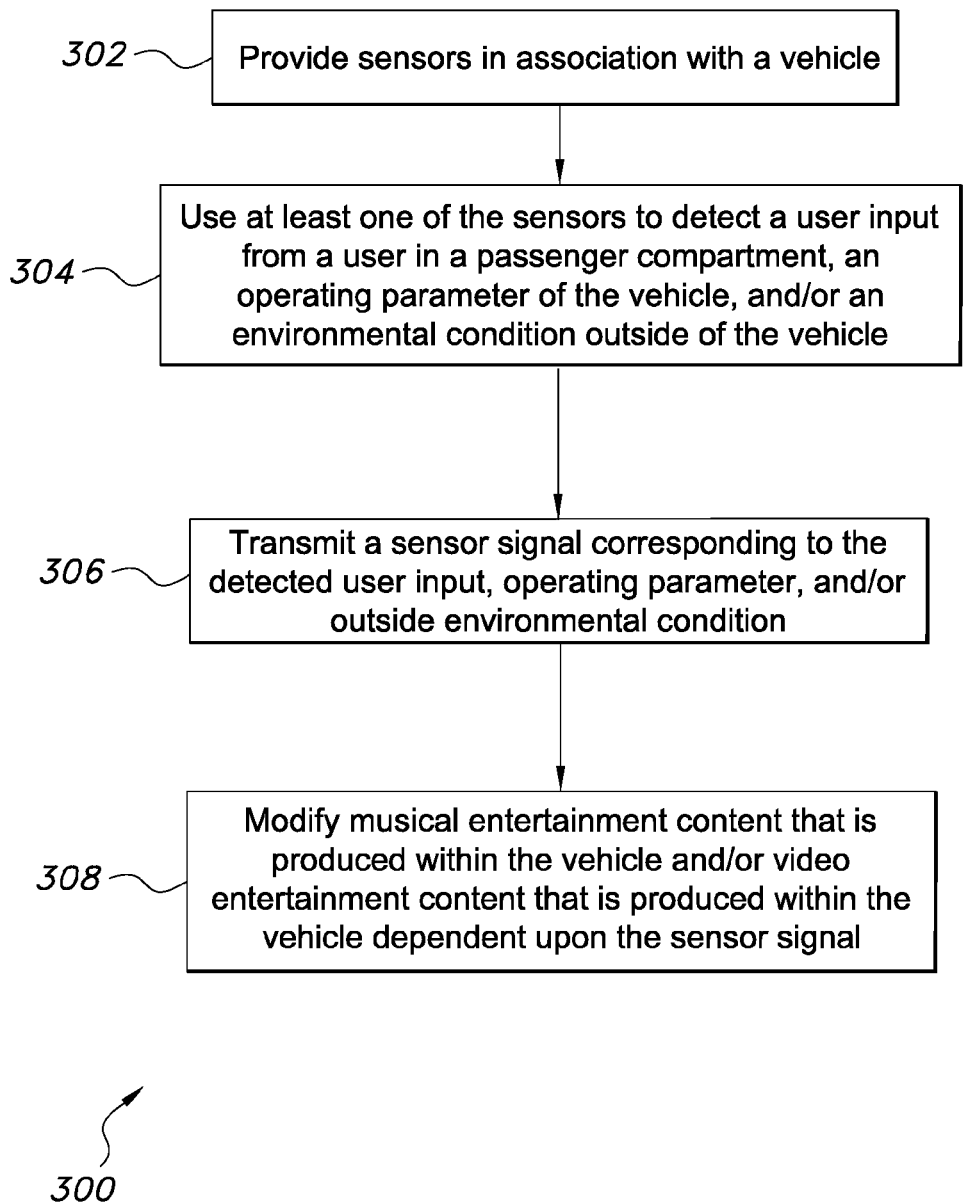
FIG. 3 is a flow chart of one embodiment of a method of the invention for operating an entertainment system in a vehicle.

FIG. 3 is a flow chart illustrating one embodiment of a method 300 of the invention for operating an entertainment system in a vehicle. In a first step 302, a plurality of sensors are provided in association with the vehicle. At least one of the sensors is associated with a passenger compartment of the vehicle. For example, within the passenger compartment, driver and passenger input sensors 26 may include cameras 46, microphones 48, touch sensors 50 and seat sensors 52. Other sensors provided within the vehicle may include windshield wiper sensors 14, window sensors 16, door sensors 18, braking sensors 20, wheel rotation speed sensors 22, engine RPM sensors 24, heater/AC/blower motor sensors 28. Outside environmental sensors may include cameras 54, rain sensor 56, microphones 58, light sensors 60 and proximity sensors 62.

In a next step 304, at least one of the sensors is used to detect a user input from a user in the passenger compartment, an operating parameter of the vehicle, and/or an environmental condition outside of the vehicle. That is, any of the sensors described above in association with step 302 may be used to detect the status of some vehicle function, some input provided by a passenger of the vehicle, or some outside environmental condition. The operating parameter may include an engine speed, a windshield wiper speed, an acceleration rate of the vehicle, a deceleration rate of the vehicle, a speed of the vehicle, an operating state of an ignition of the vehicle, an ON/OFF state, delay setting or wiper speed of a windshield wiper, an operating state of a window motor, an open position or closed position of a vehicle door, an open position or closed position of a vehicle sun roof, an operating state of a vehicle HVAC system.

Next, in step 306, a sensor signal corresponding to the detected user input, operating parameter, and/or outside environmental condition is transmitted. That is, any of the sensors described above in association with steps 302, 304 may transmit a wired or wireless electrical signal indicative of what the sensor has detected.

In a final step 308, musical entertainment content that is produced within the vehicle and/or video entertainment content that is produced within the vehicle is modified dependent upon the sensor signal. For example, the tempo, rhythm or pitch of the currently playing music may be altered to match, or to be synchronized with, the frequency of movement of some component of the vehicle or some part of the body of a human or animal inhabitant of the vehicle. A percussion sound, such as a drum beat, may be added to the music that is audibly produced within the vehicle, the percussion sound having a beat that is dependent upon the sensor signal. Alternatively, music may be selected for playback such that the selected piece of music has a tempo, rhythm or pitch that matches, or is synchronized with, the frequency of movement of some component of the vehicle or some part of the body of a human or animal inhabitant of the vehicle. As another example, music with lyrics related to the content and/or analysis of the sensor signal may be selected to be played within the vehicle. As yet another example, video screen 36 or in-car lighting 38 may change or modulate image or light color, scenes, or light intensity with a frequency that matches, or is synchronized with, the frequency of movement of some component of the vehicle or sonic part of the body of a human or animal inhabitant of the vehicle. As used herein, two frequencies may be "synchronized" with each other when one of the frequencies is equal to, or is approximately an integer multiple of the other frequency.

Within the scope of the invention, there may be alternate configurations for, or alternate ways to perform, the above-described functions. For example, the present invention may include a user configurable microprocessor based system with access to the vehicle bus and various sensors, and may include software that synthesizes aural and visual feedback.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating an audio entertainment system in a vehicle, the method comprising the steps of:
   detecting an operating parameter of the vehicle;
   transmitting a sensor signal corresponding to the detected operating parameter to a processor arrangement; and
   using the processor arrangement to musically modifying music that is audibly produced within the vehicle, the modifying being dependent upon the sensor signal, wherein the musically modifying step comprises adding a percussion sound to the music that is audibly produced within the vehicle, the percussion sound having a beat that is dependent upon the sensor signal.

2. The method of claim 1 wherein the operating parameter comprises an engine speed, a windshield wiper speed, an acceleration rate of the vehicle, a deceleration rate of the vehicle, a speed of the vehicle, an operating state of an ignition of the vehicle, an ON/OFF state of a windshield wiper, an operating state of a window motor, an open position or closed position of a vehicle door, an open position or closed position of a vehicle sun roof, an operating state of a vehicle HVAC system.

3. The method of claim 1 wherein the musically modifying step comprises selecting a song to play within the vehicle dependent upon the sensor signal.

4. The method of claim 1 wherein the music that is audibly produced within the vehicle comprises a pre-recorded song.

5. The method of claim 1 wherein the musically modifying step comprises modifying a tempo or playback speed of the music that is audibly produced within the vehicle.

6. The method of claim 5 wherein the music that is audibly produced within the vehicle comprises a pre-recorded song.

7. The method of claim 1 wherein the musically modifying step includes applying a voltage signal to the speaker such that a coil and a cone of the speaker move.

8. A method of operating an audio entertainment system in a vehicle, the method comprising the steps of:
   providing a sensor within a passenger compartment of the vehicle;
   using the sensor to detect a user input, the user input including the user in the passenger compartment rhythmically moving at least one of his body parts;
   transmitting a signal corresponding to the detected user input from the sensor to a processor arrangement; and
   using the processor arrangement to musically modify music that is audibly produced on a speaker within the vehicle, the modifying being dependent upon the signal, the musically modifying step comprises adding a percussion sound to the music that is audibly produced on the speaker within the vehicle, the percussion sound having a beat that matches a rhythm of the movement of the user's at least one body part.

9. The method of claim 8 wherein the sensor comprises a camera, a touch sensor, Theremin, seat sensor, or Wii type input device.

10. The method of claim 8 wherein the music that is audibly produced within the vehicle comprises a pre-recorded song.

11. The method of claim 8 wherein the musically modifying step includes applying a voltage signal to the speaker such that a coil and a cone of the speaker move.

12. A method of operating an audio entertainment system in a vehicle, the method comprising the steps of:
   providing a sensor within a passenger compartment of the vehicle;
   using the sensor to detect a user input, the user input including the user in the passenger compartment rhythmically moving at least one of his body parts;
   transmitting a first signal corresponding to the detected user input from the sensor to a microprocessor;
   transmitting a second signal from the microprocessor to an audio digital signal processor, the second signal being dependent upon the first signal; and
   using the audio digital signal processor to musically modify music that is audibly produced on a speaker within the vehicle, the modifying being dependent upon the second signal, the musically modifying step comprises modifying a tempo or playback speed of the music that is audibly produced on the speaker within the vehicle such that the tempo or playback speed matches a rhythm of the movement of the user's at least one body part.

13. The method of claim 12 wherein the music that is audibly produced within the vehicle comprises a pre-recorded song.

14. The method of claim 12 wherein the musically modifying step includes applying a voltage signal to the speaker such that a coil and a cone of the speaker move with a rhythm that matches a rhythm of the movement of the user's at least one body part.

15. A method of operating an entertainment system in a vehicle, the method comprising the steps of:
    providing a plurality of sensors within the vehicle, at least one of the sensors being associated with a passenger compartment of the vehicle;
    using at least one of the sensors to detect a user input from a user in the passenger compartment and/or an operating parameter of the vehicle;
    transmitting a signal corresponding to the detected user input and/or operating parameter to a processor arrangement; and
    using the processor arrangement to modifying musical entertainment content that is produced within the vehicle and/or video entertainment content that is produced within the vehicle, the modifying being dependent upon the signal, wherein the modifying step comprises modifying a tempo or playback speed of the music or music video that is audibly presented within the vehicle.

16. The method of claim 15 comprising the further step of using at least one of the sensors to detect an environmental condition outside of the vehicle, the modifying step being dependent upon the sensed outside environmental condition.

17. The method of claim 15 wherein the modifying step comprises selecting a song or music video to play within the vehicle dependent upon the signal.

18. The method of claim 15 wherein the modifying step comprises adding a percussion sound to music or a music video that is audibly presented within the vehicle, the percussion sound having a beat that is dependent upon the signal.

19. The method of claim 18 wherein the music or music video that is audibly presented within the vehicle is pre-recorded.

20. The method of claim 15 wherein the music or music video that is audibly presented within the vehicle is pre-recorded.

* * * * *